(12) United States Patent
Fan

(10) Patent No.: US 8,381,881 B2
(45) Date of Patent: Feb. 26, 2013

(54) BRAKE SENSOR APPARATUS FOR BICYCLES

(76) Inventor: Eagle Fan, Hsinchu (TW)

( * ) Notice: Subject to any disclaimer, the term of this patent is extended or adjusted under 35 U.S.C. 154(b) by 839 days.

(21) Appl. No.: 12/556,773

(22) Filed: Sep. 10, 2009

(65) Prior Publication Data

US 2011/0056774 A1    Mar. 10, 2011

(51) Int. Cl.
*F16D 66/00* (2006.01)

(52) U.S. Cl. .................. 188/1.11 E; 188/24.12; 340/432

(58) Field of Classification Search .............. 188/1.11 E, 188/24.11, 24.12, 24.22; 340/479, 432; 200/61.12
See application file for complete search history.

(56) References Cited

U.S. PATENT DOCUMENTS

| | | | | | |
|---|---|---|---|---|---|
| 4,031,343 A | * | 6/1977 | Sopko | ....................... | 200/61.12 |
| 4,899,023 A | * | 2/1990 | Shu-Hwa | ................... | 200/61.12 |
| 5,504,662 A | * | 4/1996 | Huang | ........................... | 362/473 |
| 5,526,240 A | * | 6/1996 | Kuo | .............................. | 362/473 |
| 6,320,499 B1 | * | 11/2001 | Wang | ............................. | 340/432 |
| 7,945,368 B2 | * | 5/2011 | Tristano et al. | ................. | 701/78 |

* cited by examiner

*Primary Examiner* — Bradley King
(74) *Attorney, Agent, or Firm* — Rabin & Berdo, P.C.

(57) ABSTRACT

A brake sensor apparatus is provided, including a base unit, a movement unit, a spring, a first buckle unit and a second buckle unit. The movement unit is partially confined inside the base unit so that the movement of the movement unit is restricted to a short distance and along the direction of the base unit. The spring is to allow the retracted movement unit to be moved to the original position. The first buckle unit and the second buckle unit are engaged respectively to the outer wall of base unit and movement unit, and can be hanged and buckled to the positions of brake wire of the brake. In this manner, when the bicycle brakes, the movement unit is retracted into the base unit so as to trigger the trigger switch to connect the connected circuit.

5 Claims, 5 Drawing Sheets

BRAKE SENSOR APPARATUS FOR BICYCLES

FIELD OF THE INVENTION

The present invention generally relates to a brake sensor apparatus for bicycles, and more specifically to a sensor apparatus applicable to a bicycle brake to connect or disconnect a circuit when braking process.

BACKGROUND OF THE INVENTION

Most people are overworked while under exercised. As the oil and gasoline prices rapidly increases, the cost to drive is also becoming a burden to many drivers. Bicycles, on the other hand, provide an attractive alternative to those who are health-conscious as well as the economy-conscious ones. More and more people use bicycles for short-to medium range transportation, as well as in outdoor activities.

To achieve the objects of waning or lighting, most bicycles usually use a fixed frame and a lighting device. The fixed frame is to fix a lighting device to the frame of the bicycle, such as, at the handler, behind the seat, and so on. The lighting device provides various types of lighting purposes, such as, flashing, continuous luminance, and of various colors to achieve the objects of waning or lighting. However, these types of lighting devices usually act in a pre-defined lighting state and are lack of interactive warning effect. Furthermore, if the biker forgets to turn off the lighting device, the power may be used up. Therefore, it is imperative to devise a brake sensor apparatus for bicycles to provide higher riding safety in combination with the connected lighting or warning device.

SUMMARY OF THE INVENTION

The primary object of the present invention is to provide a brake sensor apparatus, to be installed at the location of the brake on the bicycle. When the brake is activated, the circuit connected sensor apparatus is connected or disconnected so that another warning light set installed on the bicycle can generate a pre-defined lighting effects, such as flashing, enhanced red light, and so on to increase the riding safety in the night.

Another object of the present invention is to provide a brake sensor apparatus that is easy to install and use, applicable to the C-type brake or V-type brake used in bicycles. To use the sensor apparatus of the present invention, it is not necessary to replace or disassemble any existent component of the bicycle. For the biker, the installation and use is easy. In addition, the sensor apparatus can also adopt different lighting control system so that the bicycle may have more lighting options.

To achieve the above objects, the present invention provides a brake sensor apparatus, including a base unit, a movement unit, a spring, a first buckle unit and a second buckle unit. The movement unit is partially confined inside the base unit so that the movement of the movement unit is restricted to a short distance and along the direction of the base unit. The inside of base unit further includes a trigger element, and the inside of movement unit further includes a trigger switch. When the movement unit is partially retracted to a pre-defined position inside the base unit, the trigger element will trigger the trigger switch. The spring is to allow the retracted movement unit to be moved to the original position. The first buckle unit and the second buckle unit are engaged respectively to the outer wall of base unit and movement unit, and can be hanged and buckled to the different positions of the brake wire of the brake. In this manner, when the bicycle brakes, the movement unit is retracted into the base unit so as to trigger the trigger switch to connect or disconnect the connected circuit.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
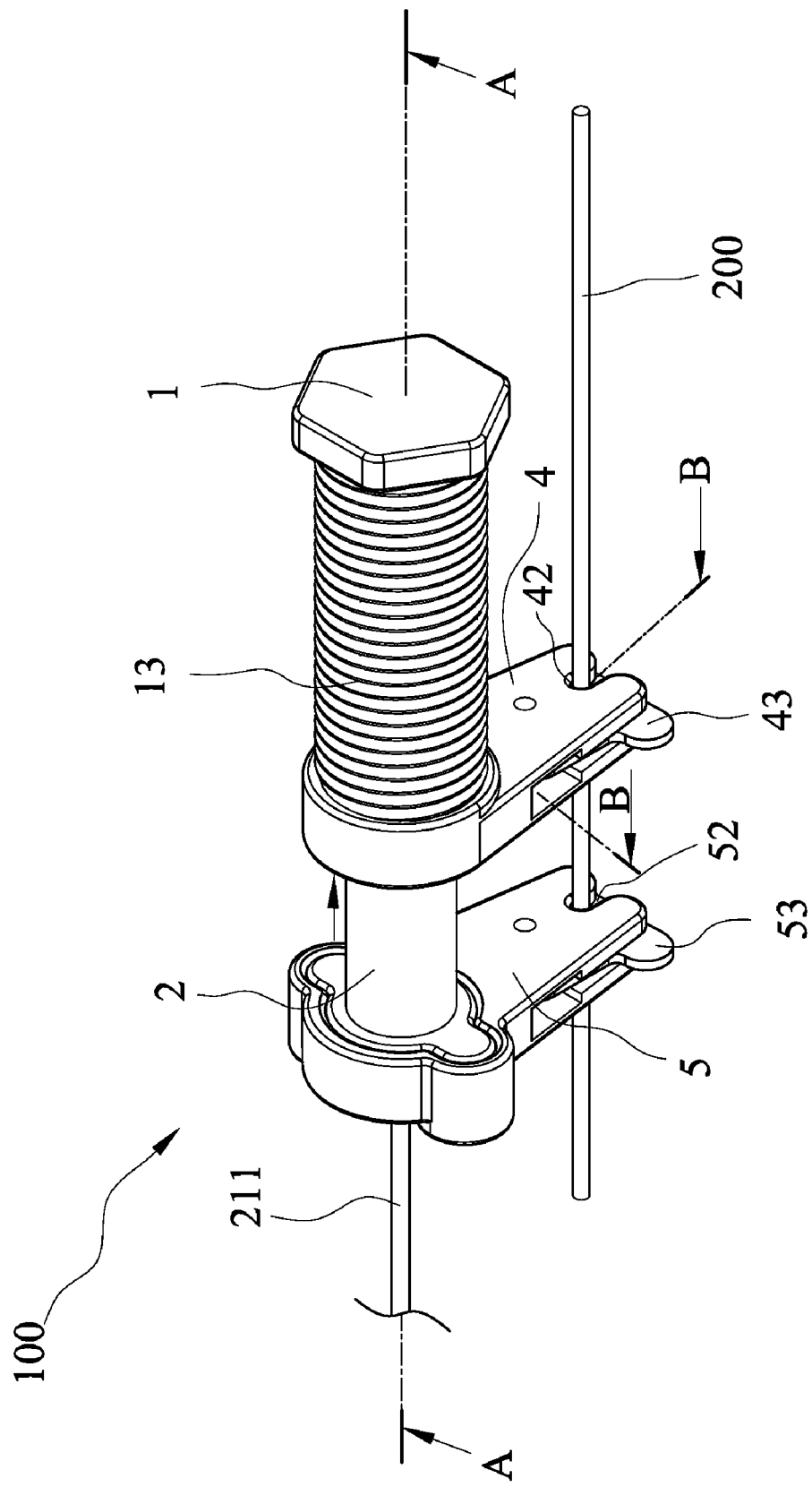
FIG. 1 shows a three-dimensional schematic view of the present invention.
Figure 2:
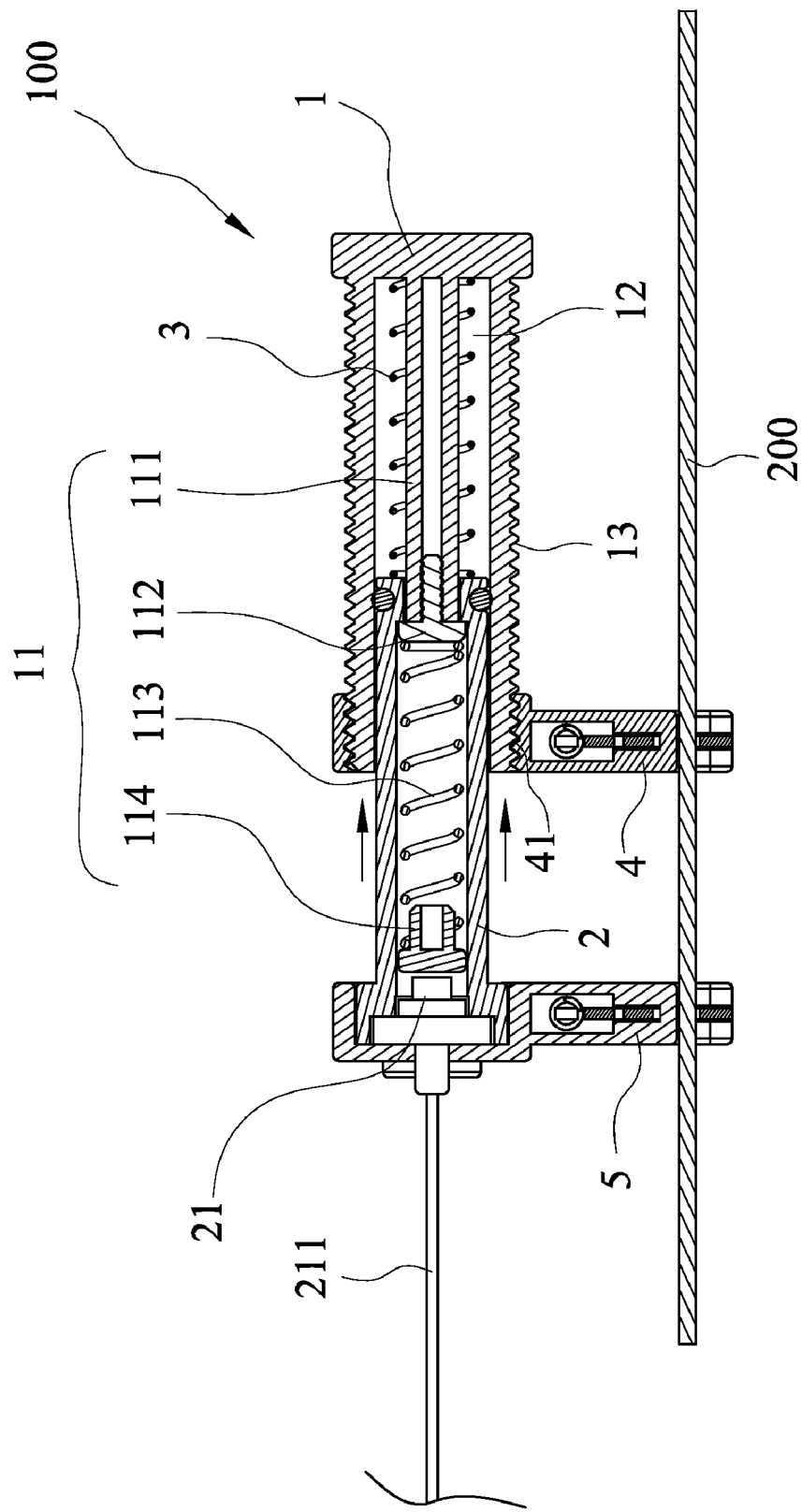
FIG. 2 shows an AA cross-sectional view of the structure shown in FIG. 1.

FIG. 1 and FIG. 2 show a schematic three-dimensional view and a cross-sectional view of the present invention. As shown in FIGS. 1 and 2, a brake sensor apparatus 100 of the present invention is installed to a brake wire 200. Brake sensor apparatus 100 includes a base unit 1, a movement unit 2, a spring 3, a first buckle unit 4 and a second buckle unit 5. Movement unit 2 is partially confined inside base unit 1 so that movement unit 2 can only move in a short distance along the direction of base unit 1. Spring 3 provides the force for movement unit 2 back to the original position after retracted into base unit 1. First buckle unit 4 is engaged to the outer wall of base unit 1. When in use, first buckle unit 4 is hanged and buckled to brake wire 200 of the brake of the bicycle. Second buckle unit 5 is engaged to the outer wall of movement unit 2, and is hanged and buckled to brake wire 200 when in use. The inside of base unit 1 includes a trigger element 11 and the inside of movement unit 2 includes a trigger switch 21. With trigger element 11 and trigger switch 21, when the brake of the bicycle is activated, the distance between first buckle unit 4 and second buckle unit 5 is shortened, and movement unit 2 is partially retracted into base unit 1 so that trigger element 11 appropriately triggers trigger switch 21 to connect the connected circuit The following describes the linkage and the structure of all the components in details. Base unit 1 is a hollow tube with one end closed. Trigger element 11 is located at the center position inside base unit 1. Trigger element 11 further includes a protruding post 111, a screw stopper 112, a spring 113 and a push block 114. A housing space 12 exists between the inner all of base unit 1 and trigger element 11. Movement unit 2 is also a hollow tube, with a partial segment located in housing space 12, and the remaining segment extends beyond the open end of base unit 1. Protruding post 111 is fixed inside base unit 1, but with a segment partially extending into the tube of movement unit 2. Screw stopper 112 is screwed to the end of protruding post 11 located inside movement unit 2. Because the end of movement unit 2 inside base unit 2 has a smaller diameter, screw stopper 112 with larger diameter can be used to screw and fasten to protruding post 111 to prevent movement unit 2 from disengaged from base unit 1. Spring 113 and push block 114 are located inside the tube of movement unit 2. Push block 114 is engaged to one end of spring 113 away from movement unit 2. Trigger switch 21 is an off-the-shelf small switch, and is fixed to inside the tube of movement unit 2 at the location of one end away from base unit 1. Trigger switch 21 is further connected to a conductive wire 211 connected to external circuit so as to transmit signals. In this manner, when movement 2 is partially retracted to a predefined position inside base unit 1, spring 113 is compressed. When spring 113 is compressed to a predefined extent, push block 114 triggers trigger switch 21.

Spring 3 is located inside housing space 12 of base unit 1, sheathed on the outer surface of protruding post 111. The two ends of spring 3 push respectively against the inner wall of base unit 1 and the end of movement unit 2. When movement unit 2 retracts into base unit 1 due to external force, spring 3 can restore movement unit 2 back to original position after the external force disappears.

Figure 3B:
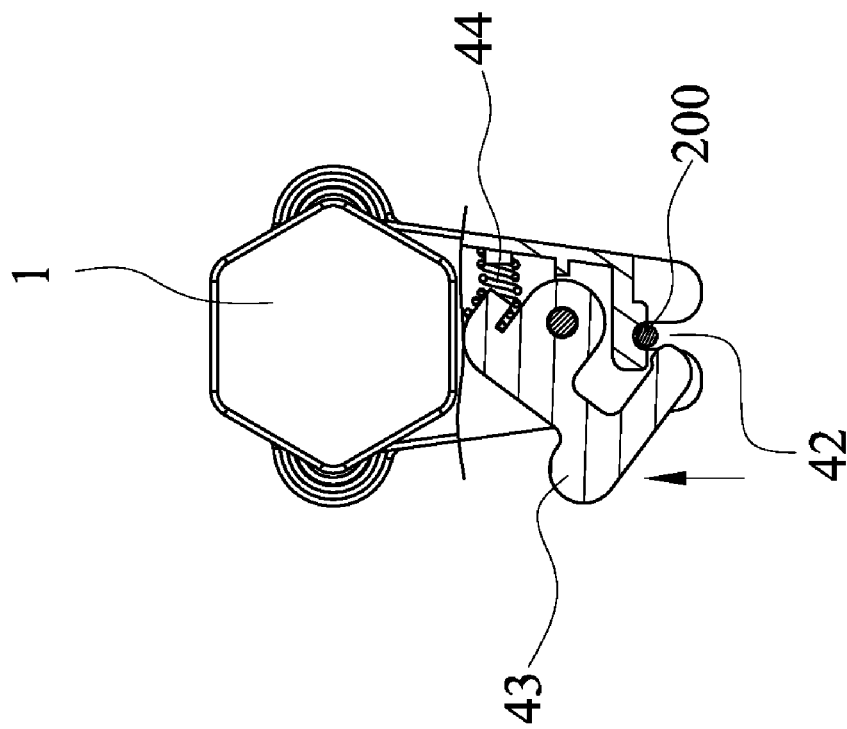
FIG. 3B shows a cross-sectional view of the gate of first buckle unit when opened.
Figure 3A:
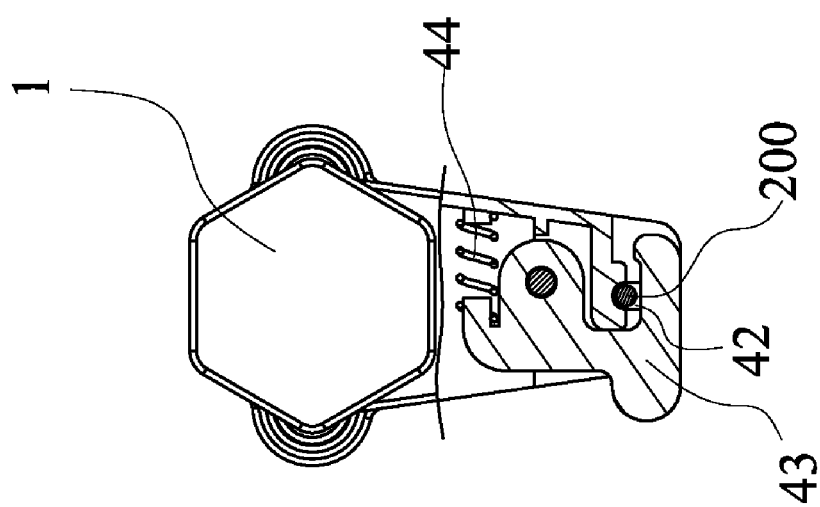
FIG. 3A shows a BB cross-sectional view of the structure shown in FIG. 1.

First buckle unit 4 is engaged to the outer wall of base unit 1. The position of engagement can be adjusted. The engagement can be accomplished by screw teeth coupling. For example, the outer wall of base unit 1 has outer screw teeth and first buckle has a hole with inner screw teeth 41. In this manner, first buckle unit 4 can be engaged to base unit 1 by screw teeth coupling and the position of first buckle unit 4 on base unit 1 can be adjusted. The surrounding of first buckle 4 forms an opening 42 and a gate 43. Opening 42 is for accommodating brake wire 200. When gate 43 is closed, brake wire 200 cannot escape from opening 42. FIG. 3A shows a partial cross-sectional view of first buckle unit 4 of the present invention. FIG. 3A shows the structure of gate 43. As shown in FIG. 3A, the center position of gate 43 is coupled to inside of the main body of first buckle unit 4. The side of gate 43 away from opening 42 is engaged to stop a spring 44 so that gate 43 will usually stay in the condition with opening 42 closed. As shown in FIG. 3B, when gate 43 is pushed, opening 42 is opened and brake wire 200 can escape from opening 42.

As shown in FIG. 1, second buckle unit 5 is engaged to the outer wall of movement unit 2. The relative position between movement unit 2 and second buckle unit 5 is not adjustable. The surrounding of second buckle unit 5 forms an opening 52 and a gate 53. Opening 52 is also for accommodating brake wire 200. The structure of gate 53 is similar to the structure of gate 43 of first buckle unit 4, and the description is omitted here.

Figures 4, 5:
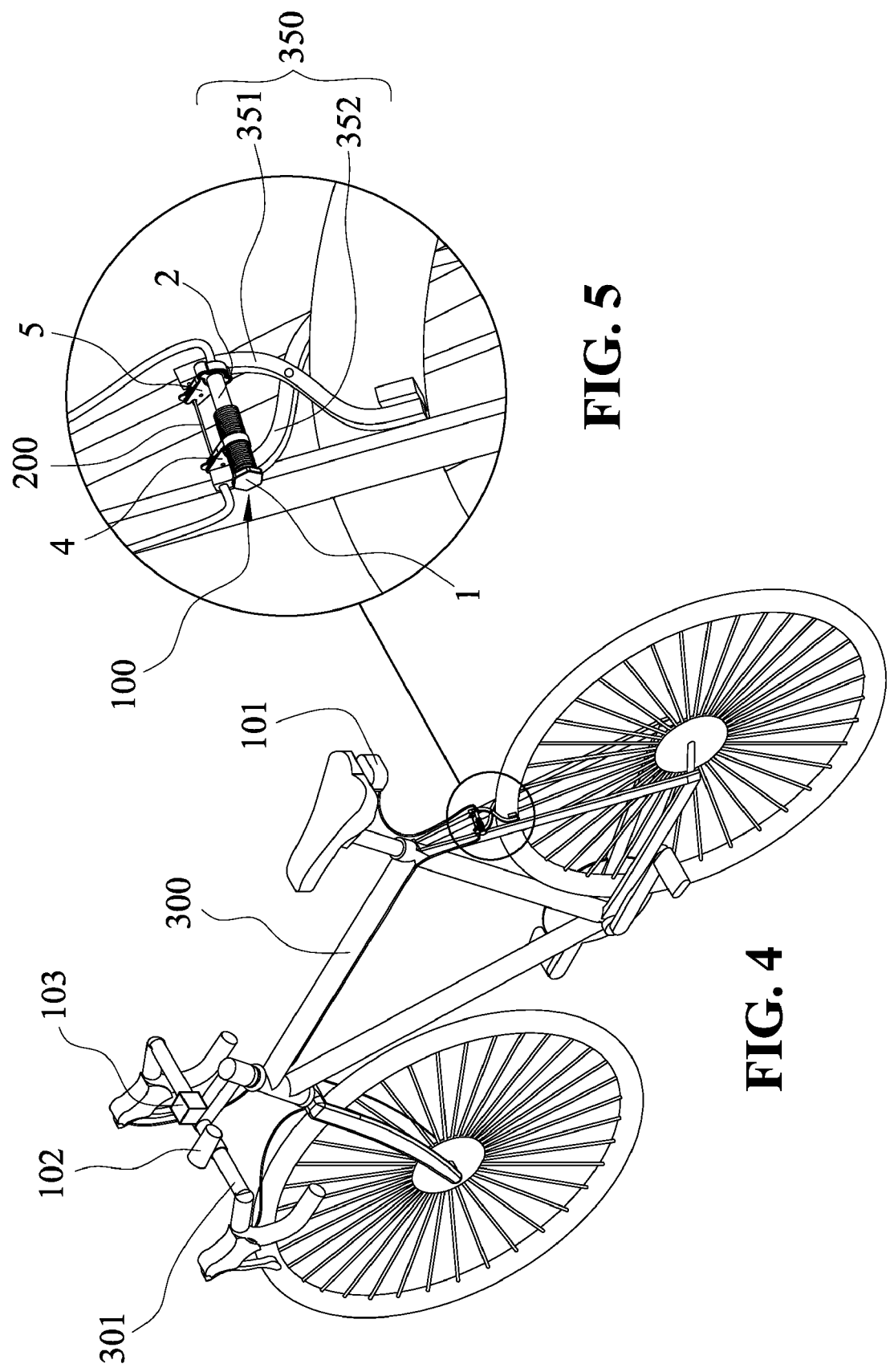
FIG. 4 shows a three-dimensional view of the present invention installed on a bicycle.
FIG. 5 shows a partial enlarged view of the application in FIG. 4.
Figure 6:
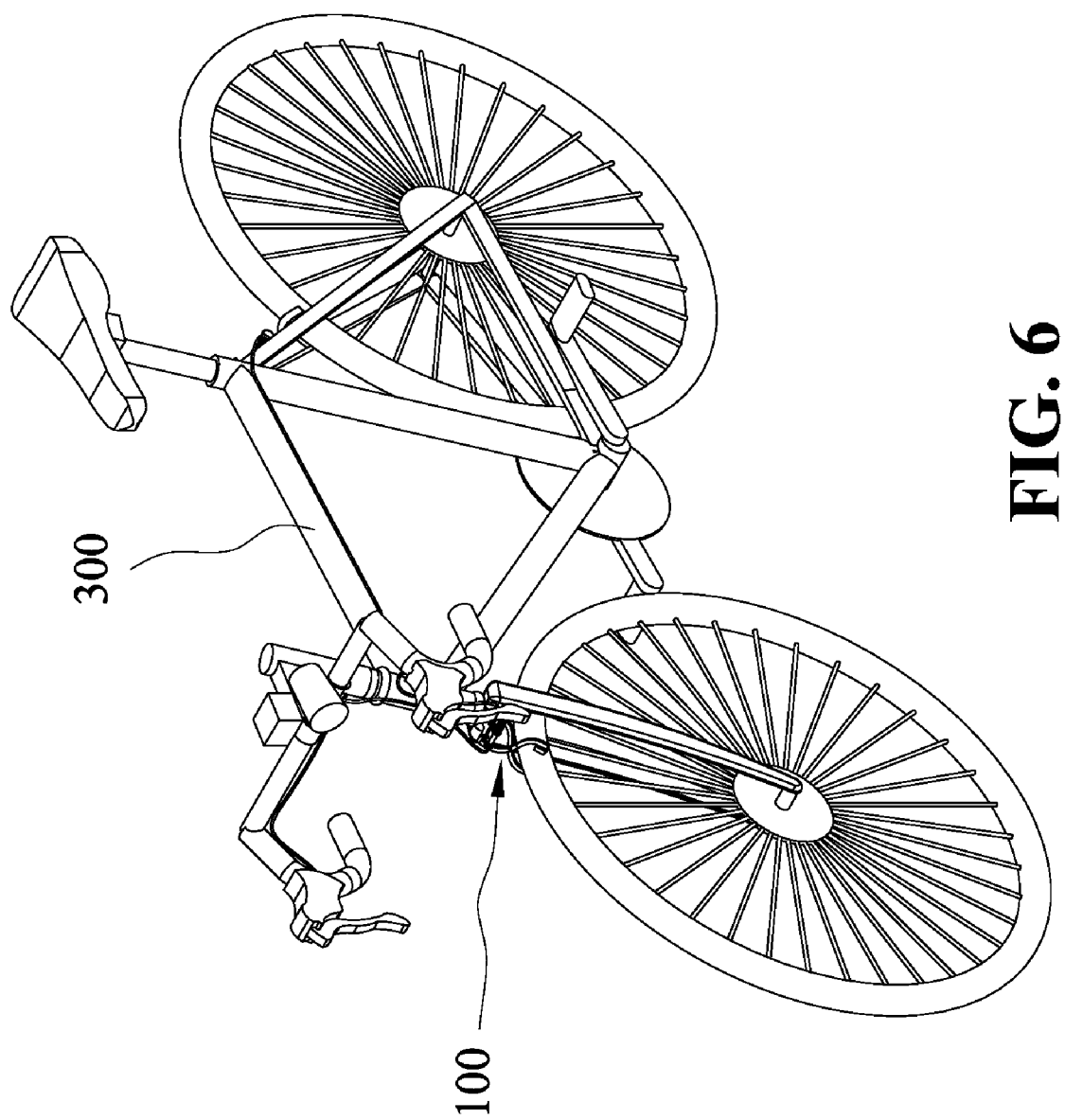
FIG. 6 shows another view of the present invention installed on a bicycle.

FIGS. 4 and 5 show schematic views of the actually applications of the present invention. The brake sensor apparatus of the present invention can be used with different lighting device in actual application so that suitable warning effects can be displayed when braking. The used lighting device can be varied according to the biker's need. The embodiments of the present invention are only exemplary, and thus are not restrictive. In an exemplary embodiment of the present invention, brake sensor apparatus 100 is used with a warning device 101, a lighting device 102 and a control device 103. Warning device 101 is installed above the rear tire of bicycle 300, while lighting device 102 and control device 103 are installed at handle 301 of bicycle 300. Brake sensor apparatus 100 is installed at brake 350 of bicycle 300. As shown in FIG. 5, brake 350 is a C-type brake. Brake 350 has a linked rod 351 and a linked rod 352, coupled in a cross-fashion. Linked rods 351, 352 have brake pad on the inner side at the bottom. The tops of linked rods 351, 352 are connected to a brake wire 200. When brake wire 200 is pulled, the distance between linked rods 351, 352 is shortened to brake. First buckle unit 4 and second buckle unit 5 of brake sensor apparatus 100 of the present invention are buckled to brake wire 200 between linked rod 351 and linked rod 352. The distance between first buckle unit 4 and second buckle unit 5 must be adjusted so that the distance must be equal to the distance between linked rod 351 and linked rod 352 before the brake activation. In this manner, when brake wire 200 is pulled, the distance between linked rods 351, 352 is shortened so that linked rods 351, 352 will synchronously push first buckle unit 4 and second buckle unit 5 to shorten the distance between first buckle unit 4 and second buckle unit 5. When movement unit 2 is partially retracted into base unit 1, trigger element 11 triggers trigger switch 21 to use control device 103 so that warning device 101 will display suitable lighting effect, such as, continuous flashing, enhanced red lighting, or changing from yellow light to red light, and so on, so as to warn the trailing vehicles to keep the distance. In addition, as shown in FIG. 6, brake sensor apparatus 100 of the present invention is installed at the brake of the front tire of bicycle 300. In this manner, the brake sensor apparatus 100 of the present invention can be employed according to the user's need by installing one or two sets, i.e., both front tire and rear tire.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A brake sensor apparatus for bicycles, comprising:
a base unit being a hollow tube with a closed end and an open end;
a movement unit being a hollow tube and being partially confined inside said base unit so that said movement unit is only able to move a short distance along a direction of said base unit, said movement unit having a segment partially confined inside the hollow tube of said base unit and having a remaining segment that extends beyond the open end of said base unit, an end of said movement unit located within said base unit having a reduced diameter relative to an inside diameter of the hollow tube of said movement unit,
a trigger element comprising a protruding post fixed to an inside of said base unit and having a segment partially extending into the hollow tube of said movement unit, a screw stopper fastened to one end of said protruding post inside said movement unit and being abutable against the reduced diameter end of said movement unit to prevent said movement unit from escaping from said base unit, a spring located inside said movement unit, and a push block located inside said movement unit, said trigger element being located at a center position inside the hollow tubes, a hollow space being formed between an inner wall of said based unit and said trigger element, said trigger element preventing said movement unit from being disengaged from said base unit and restricting a movement distance of said movement unit;

a trigger switch located inside said movement unit in a direction away from said base unit, wherein when said movement unit is partially retracted to a pre-defined position inside said base unit by an external force, said spring is compressed, and when said spring is compressed to a certain extent, said push block triggers said trigger switch to activate said trigger switch;

a further spring located inside said base unit to provide a force to restore said movement unit to its original position after the external force that causes said movement unit to retract is removed;

a first buckle unit engaged to and hanging from an outer wall of said base unit, and being buckled to a brake wire of a brake of a bicycle; and a second buckle unit engaged to and hanging from said movement unit and being buckled to the brake wire.

2. The brake sensor apparatus as claimed in claim 1, wherein a position of said first buckle unit is adjustable.

3. The brake sensor apparatus as claimed in claim 2, wherein said outer wall of said base unit has outer screw teeth, said first buckle unit has a hole with inner screw teeth, and said first buckle unit is engaged to said base unit by engaging the inner screw teeth with the outer screw teeth.

4. The brake sensor apparatus as claimed in claim 1, wherein said first buckle unit has an opening and a gate, said opening accommodating the brake wire, and said gate closing the opening.

5. The brake sensor apparatus as claimed in claim 1, wherein said second buckle unit has an opening and a gate, said opening accommodating said brake wire, and said gate closing the opening.

* * * * *